(12) United States Patent
Hansen et al.

(10) Patent No.: US 10,480,490 B2
(45) Date of Patent: Nov. 19, 2019

(54) LIGHTNING CURRENT TRANSFER UNIT FOR A WIND TURBINE

(71) Applicant: VESTAS WIND SYSTEMS A/S, Aarhus N (DK)

(72) Inventors: Anders Niels Hansen, Langå (DK); Morten Bagger Søgaard, Aarhus (DK); Claus Grøn Lyngby, Brædstrup (DK); Gert Lading, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 326 days.

(21) Appl. No.: 15/536,302

(22) PCT Filed: Dec. 18, 2015

(86) PCT No.: PCT/DK2015/050406
§ 371 (c)(1),
(2) Date: Jun. 15, 2017

(87) PCT Pub. No.: WO2016/095932
PCT Pub. Date: Jun. 23, 2016

(65) Prior Publication Data
US 2017/0350373 A1    Dec. 7, 2017

(30) Foreign Application Priority Data
Dec. 18, 2014  (DK) .................................. 2014 70802

(51) Int. Cl.
*F03D 80/30*    (2016.01)
*F03D 1/06*     (2006.01)

(52) U.S. Cl.
CPC ........... *F03D 80/30* (2016.05); *F03D 1/0675* (2013.01); *F03D 1/0691* (2013.01);
(Continued)

(58) Field of Classification Search
CPC ...................................................... F03D 80/30
See application file for complete search history.

(56) References Cited

U.S. PATENT DOCUMENTS

| | | | | |
|---|---|---|---|---|
| 1,253,265 A | * | 1/1918 | McKeown | F02P 7/0632 200/19.12 |
| 7,654,790 B2 | * | 2/2010 | Molbech | H02G 13/00 415/1 |
| 2013/0181457 A1 | * | 7/2013 | Lyngby | H01T 4/08 290/55 |

FOREIGN PATENT DOCUMENTS

| | | |
|---|---|---|
| DE | 102007052525 A1 | 5/2009 |
| EP | 1154537 A2 | 11/2001 |

(Continued)

OTHER PUBLICATIONS

Danish Search Report for PA 2014 70802, dated Jul. 14, 2015.
International Search Report for PCT/DK2015/050406, dated Feb. 24, 2016.

*Primary Examiner* — Igor Kershteyn
*Assistant Examiner* — Juan G Flores
(74) *Attorney, Agent, or Firm* — Patterson + Sheridan, LLP

(57) ABSTRACT

A lightning current transfer unit for a wind turbine, the wind turbine comprising a first part and a second part being rotatable relative to each other, wherein the lightning current transfer unit is arranged to provide electrical contact between the first and second parts, the lightning current transfer unit comprising: a first current transfer portion comprising a first slider and configured to be electrically coupled to a first electrically conducting slideway of the first part of the wind turbine, the first slider being rotatable relative to the first slideway; a second current transfer portion configured to be electrically coupled to an electrically conducting portion of the second part of the wind
(Continued)

turbine; a first main spring biasing the first slider towards the first slideway; wherein the first slider comprises: a primary contact biased towards the first slideway by the first main spring; a secondary contact arranged to move relative to the primary contact; and a secondary spring arranged between the first main spring and the secondary contact such that the secondary spring biases the primary contact away from the first slideway and biases the secondary contact towards the first slideway.

22 Claims, 14 Drawing Sheets

(52) U.S. Cl.
CPC ..... *F05B 2240/14* (2013.01); *F05B 2240/221* (2013.01); *F05B 2260/502* (2013.01); *Y02E 10/721* (2013.01)

(56) References Cited

FOREIGN PATENT DOCUMENTS

| EP | 2336559 A1 | 6/2011 |
| WO | 2004044419 A1 | 5/2004 |
| WO | 2005/050008 A1 | 6/2005 |
| WO | 2012016568 A2 | 2/2012 |

* cited by examiner

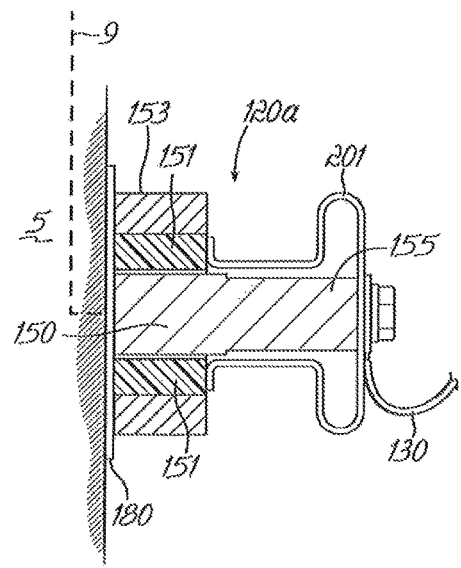 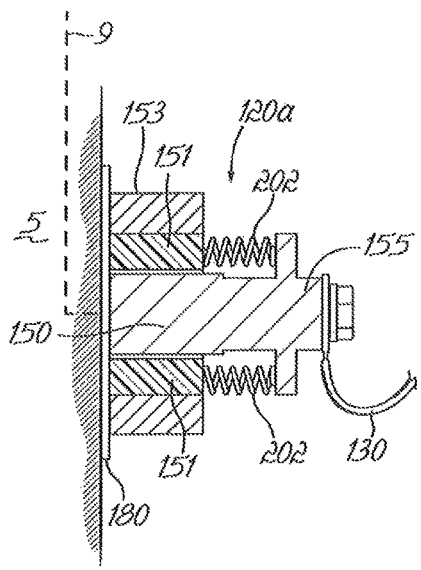
FIG. 10a  FIG. 10b
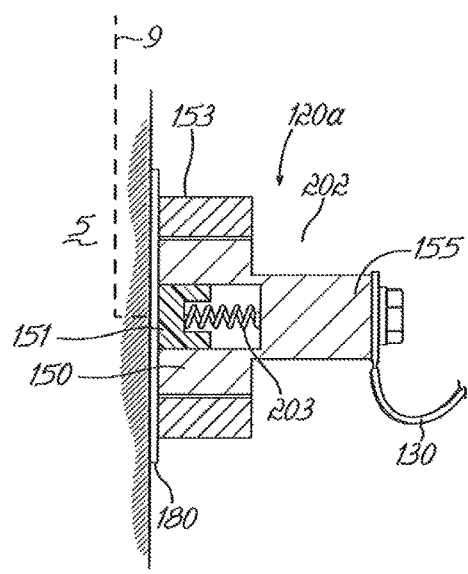
FIG. 10c

US 10,480,490 B2

LIGHTNING CURRENT TRANSFER UNIT FOR A WIND TURBINE

The invention relates to a lightning current transfer unit for a wind turbine. The invention particularly relates to a lightning current transfer unit that can discharge lightning currents and static charge from a wind turbine blade.

BACKGROUND TO THE INVENTION

FIG. 1 illustrates a typical wind turbine 1 for use in large scale electricity generation on a wind farm. The wind turbine 1 includes a tower 2 and a wind turbine nacelle 3 positioned on top of the tower. The wind turbine rotor, comprising three wind turbine blades 5 connected to a hub 4, is connected to the nacelle through a main shaft (not shown in FIG. 1) which extends out of the front of the nacelle. Wind beyond a certain level activates the rotor due to lift induced on the blades and causes the rotor to rotate. The rotation is converted to electric power, which is supplied to the electricity grid.

These tall wind turbines are located on exposed sites to maximize exposure to the wind, but they are also very exposed to lightning strikes which may cause damage to a wind turbine. Thus, wind turbines are typically provided with a lightning protection system.

FIGS. 2a and 2b illustrate a typical lightning protection system in each of the wind turbine blades 5 (a single blade is shown in these Figures). The blades and, in particular, the tips of the blades are the most likely components of a wind turbine to be susceptible to a lightning strike as they are the components that project the highest. Thus, the wind turbine blade 5 of FIG. 2a includes a tip with a metal receptor 8 that intercepts lightning strikes 7 and the receptor is grounded or earthed. The receptor is connected to a lightning down conductor 9 inside the wind turbine blade. The down conductor extends through the blade in the longitudinal direction and ends at the hub 4. FIG. 2b illustrates schematically one known arrangement in which lightning current is transferred from the lightning down conductor 9 to the rest of the lightning protection system and to ground. From the down conductor 9, the lightning current is transferred to the main shaft 10 of the wind turbine through a pitch bearing 13 or any other mechanism between the blade and the shaft. In the nacelle 3, there are sliding contacts or slip rings in contact with the main shaft in order to carry current from the shaft. The slip rings are connected to ground 11 by a down conductor extending through the wind turbine tower 2.

Problems with this type of arrangement are identified in International patent application No. WO2005/050008 in the name of Vestas Wind Systems A/S. These include that the high energy of the lightning current passing through different components of the wind turbine such as the blade pitch bearing 13 and the main shaft bearing may damage these components and that the slip ring arrangement is inefficient.

WO2005/050008 describes an improved lightning current transfer unit to address these problems. It is illustrated in FIGS. 3a to 5.

The lightning current transfer unit 15 of FIG. 3a forms an electrical connection between a lightning down conductor of each blade 5 of the rotor via an electrically conducting ring or blade band 18 around the outside of each blade of the wind turbine and a lightning down conductor of the nacelle 3 via an electrically conducting ring or lightning ring 16 on the nacelle.

As shown best in FIG. 3b, the lightning current transfer unit 15 is mounted on the hub 4 facing the nacelle 3. The lightning current transfer unit 15 projects outwardly from the hub 4 in a space between the wind turbine blade 5 and the front of the nacelle 3. As the lightning current transfer unit 15 is mounted to the hub, it rotates with the hub.

Referring back to FIG. 3a, the electrically conducting or metal band 18 around the outside of each blade 5 surrounds the root of the blade. The band forms a contact surface 18 on the root of the wind turbine blade above the pitching mechanism and perpendicular to the longitudinal direction of the blade. The contact surface thus rotates with pitching of the blade. Each band is connected to the lightning down conductor 9 inside the wind turbine blade as described above.

The conducting ring 16 on the outside of the nacelle 3 facing the hub 4 is mechanically connected to the nacelle. It is electrically connected to a lightning down conductor 14 of the nacelle. The ring 16 forms a nacelle contact surface 17 to the lightning current transfer unit 15.

FIGS. 3b and 3c illustrate in more detail the position of the lightning current transfer unit 15 in relation to the contact surface 18 on the wind turbine blade and the contact surface 17 on the nacelle. It also illustrates the different sections of the lightning current transfer unit 15, which include a base support part 22, two contacts 19a, 19b and flexible links 26, 27 between the base support part and the two contacts. The flexible links ensure that the two contacts are forced against the contact surface 18 on the wind turbine blade 5 and the contact surface 17 of the nacelle 3, respectively. The two contacts 19a, 19b and the two contact surfaces 17, 18 establish two contact areas 20a, 20b.

The first of the contact areas 20a ensures a contact to the electrically conducting band 18 of the blade 5 and the other 20b to the conducting ring 16 of the nacelle 3. The two contacts 19a, 19b are connected by a dedicated electric connection 30 in the form of a wire or cable.

Each of the contacts 19a, 19b also comprises a retaining bolt 28, 29 for the dedicated electric connection 30 allowing the electric connection to be established and retained between the two contacts. The electric connection 30 is made of a flexible material with a length corresponding to the distance between the two contacts at their rest position, when they are furthest apart. If the lightning connection means or lightning current transfer unit 15 is exposed to forces the flexible link will bend resulting in a more sagging electric connection 30.

FIG. 3d illustrates in cross section the contact 19a. It will be appreciated that that the contact 19b will have the same construction. The contact 19a comprises a metal contact 31 which is in electrical contact with the blade band 18 surrounded by a plastic insulating material 32.

FIG. 4 illustrates schematically the contact areas of the lightning current transfer unit sliding on the contact surface 17 of the conducting ring 16 of the nacelle 3. It illustrates the situation of a rotating three-bladed wind turbine rotor with three lightning current transfer units including contacts 19b. As each lightning current transfer unit is mounted on the hub they will rotate with the main shaft as the centre of rotation. Further, the contacts are positioned at a distance from the centre corresponding to the diameter of the ring 16. The contacts will thus perform a circular rotation facing the ring while being continuously forced against the surface of the ring.

FIG. 5 illustrates the contact surface 18 of the blade 5. The contact 19a is continuously forced against the contact surface or blade band and slides on the surface when the blade is pitched to one or the other side, as indicated by the double headed arrow.

While this arrangement is effective as a lightning current transfer unit, it has been found that under certain conditions the contacts 19a, 19b may bounce off their respective contact surfaces if there are any imperfections in the contact surfaces 17, 18. In addition, the diameter of the blade root on a large turbine may be about 4 meters and this means that the blade band 18 on the blade (if it extends around half the circumference of the blade root) will be over 6 meters long. It is very difficult for this 6 meter long contact surface to have a constant curvature and this means that the contacts may also bounce off the contact surface due to the change in curvature of the contact surface. Under certain site and environmental conditions this may lead to sparks between the contacts and the contact surfaces which in turn may lead to electromagnetic interference. It may be possible to bias the contacts 19a, 19b against the contact surface 18, 17 with a greater force. However, this will lead to high wear on the contacts 19a, 19b with the result that they will have a short lifetime.

In addition the contacts 19a, 19b and the contact surfaces 18, 17 can never be truly smooth as all real surfaces have some form of roughness. The actual area of contact (of a contact 19a, 19b on a respective contact surface 18, 17) is only a small fraction of the total surface area of the contacts 19a, 19b. It can result that the actual contact between a contact 19a, 19b and the respective contact surface 18, 17 is only made by the plastic insulating material 32 and not the metal contact 31. This, under certain conditions, may also lead to sparks between the contact surfaces 18, 17 and the metal contacts 31.

It is an aim of this invention to overcome the problem of the contacts bouncing off their respective contact surfaces. It is also an aim of this invention to ensure that the contacts are in direct electrical connection with their respective contact surfaces.

SUMMARY OF INVENTION

According to the present invention there is provided a lightning current transfer unit for a wind turbine, the wind turbine comprising a first part and a second part being rotatable relative to each other, wherein the lightning current transfer unit is arranged to provide electrical contact between the first and second parts, the lightning current transfer unit comprising: a first current transfer portion comprising a first slider and configured to be electrically coupled to a first electrically conducting slideway of the first part of the wind turbine, the first slider being rotatable relative to the first slideway; a second current transfer portion configured to be electrically coupled to an electrically conducting portion of the second part of the wind turbine; a first main spring biasing the first slider towards the first slideway; wherein the first slider comprises: a primary contact biased towards the first slideway by the first main spring; a secondary contact arranged to move relative to the primary contact; and a secondary spring arranged between the first main spring and the secondary contact such that the secondary spring biases the primary contact away from the first slideway and biases the secondary contact towards the first slideway.

The provision of a secondary contact which can move relative to the primary contact and which is biased towards the slideway ensures a continuous electrical connection between the slideway and the slider, even if the primary contact is not in direct electrical connection with the slideway. The provision of the secondary spring also counteracts the force of the main spring which acts on the primary contact, which serves to increase the service lift of the primary contact.

The first and the second part of the wind turbine may a blade and a nacelle; or a blade and a hub; or a hub and a nacelle. The slideway may be a blade band or a conducting nacelle ring.

Preferably, the primary contact and the first slideway form a first current path to discharge electric charges from the first part, and the secondary contact and the first slideway form a second current path to discharge electric charges from the first part. With this arrangement, there are two current paths by which electrical charge can be discharged from the first part to the second part. In use, lightning charges will be discharged via the first current path and static charge will be discharged via the second current path.

Preferably, the first main spring is a non-conductive elastically bendable strip. It may be formed from fibre glass. The use of a non-conductive strip allows the slider to be electrically insulated from where it is mounted, which may be a hub of the wind turbine.

Preferably, the first slider is hinged to the elastically bendable strip. This allows the slider to swivel and account for variations on the surface of the slideway.

The secondary spring is arranged between the primary contact and the secondary contact. This arrangement biases the primary and the secondary contacts away from each other.

Preferably, the secondary spring is electrically conductive. The secondary spring may be a coil spring. A coil spring has a higher inductance compared to a straight spring and will limit the current that can be discharged through the secondary spring which will prevent damage to the spring. The secondary spring may be a compression spring or it may be a torsion spring. Preferably, the secondary spring provides a path for electrical current between the secondary contact and the primary contact.

The lightning current transfer unit may further comprise an electrically insulating material surrounding the primary and secondary contacts, wherein the electrically insulating material is fixed relative to the primary contact. Preferably, the electrically insulating material is formed from plastic.

Preferably, the primary and secondary contacts are sliding contacts. The electrically insulating material may be configured to slide on the first slideway.

Preferably, the secondary contact is an alloy comprising copper and graphite.

The second current transfer portion may comprise a second slider configured to be electrically coupled to a second electrically conducting slideway of the second part of the wind turbine, the second slider being rotatable relative to the second slideway; the lightning current transfer unit may further comprise a second main spring biasing the second slider towards the second slideway; wherein the second slider comprises: a primary contact biased towards the second slideway by the second main spring; a secondary contact arranged to move relative to the primary contact; and a secondary spring arranged between the second main spring and the secondary contact such that the secondary spring biases the primary contact away from the second slideway and biases the secondary contact towards the second slideway.

According to the invention, there is provided a wind turbine comprising a hub, a nacelle a blade and a lightning current transfer unit as described above, the lightning current transfer unit enabling electrical charges to be discharged from the blade to the nacelle.

In an embodiment, the first part of the wind turbine may be the blade, and the blade may be pitchably mounted on the hub and the first slideway is mounted on the blade. Or, the first part of the wind turbine may be the nacelle, and the first slideway is mounted on the nacelle. Or, the first part of the wind turbine may be the hub, and the first slideway is mounted on the hub.

In a further embodiment, the first part of the wind turbine may be the blade, and the blade is pitchably mounted on the hub and the first slideway is mounted on the blade; the second part of the wind turbine is the nacelle and the second slideway is mounted on the nacelle; and the first main spring and the second main spring are mounted on the hub and electrically insulated from the hub; wherein the first and second sliders are electrically connected in order to establish a current path from the blade to the nacelle thereby electrically bypassing the hub.

In a further embodiment, the first part of the wind turbine may be the blade, and the blade is pitchably mounted on the hub and the first slideway is mounted on the blade; the second part of the wind turbine is the nacelle and the second slideway is mounted on the hub and electrically insulated from the hub; the first slider is mounted on the hub by the first main spring and electrically insulated from the hub; and the second slider is mounted on the nacelle by the second main spring; wherein the first and second sliders are electrically connected in order to establish a current path from the blade to the nacelle thereby electrically bypassing the hub.

BRIEF DESCRIPTION OF THE DRAWINGS

The invention will now be described, by way of example only, with reference to the accompanying drawings in which:

FIGS. 10a to 10c illustrate, in cross-section, three further examples of current transfer portions.

DETAILED DESCRIPTION OF THE INVENTION

Figure 1:
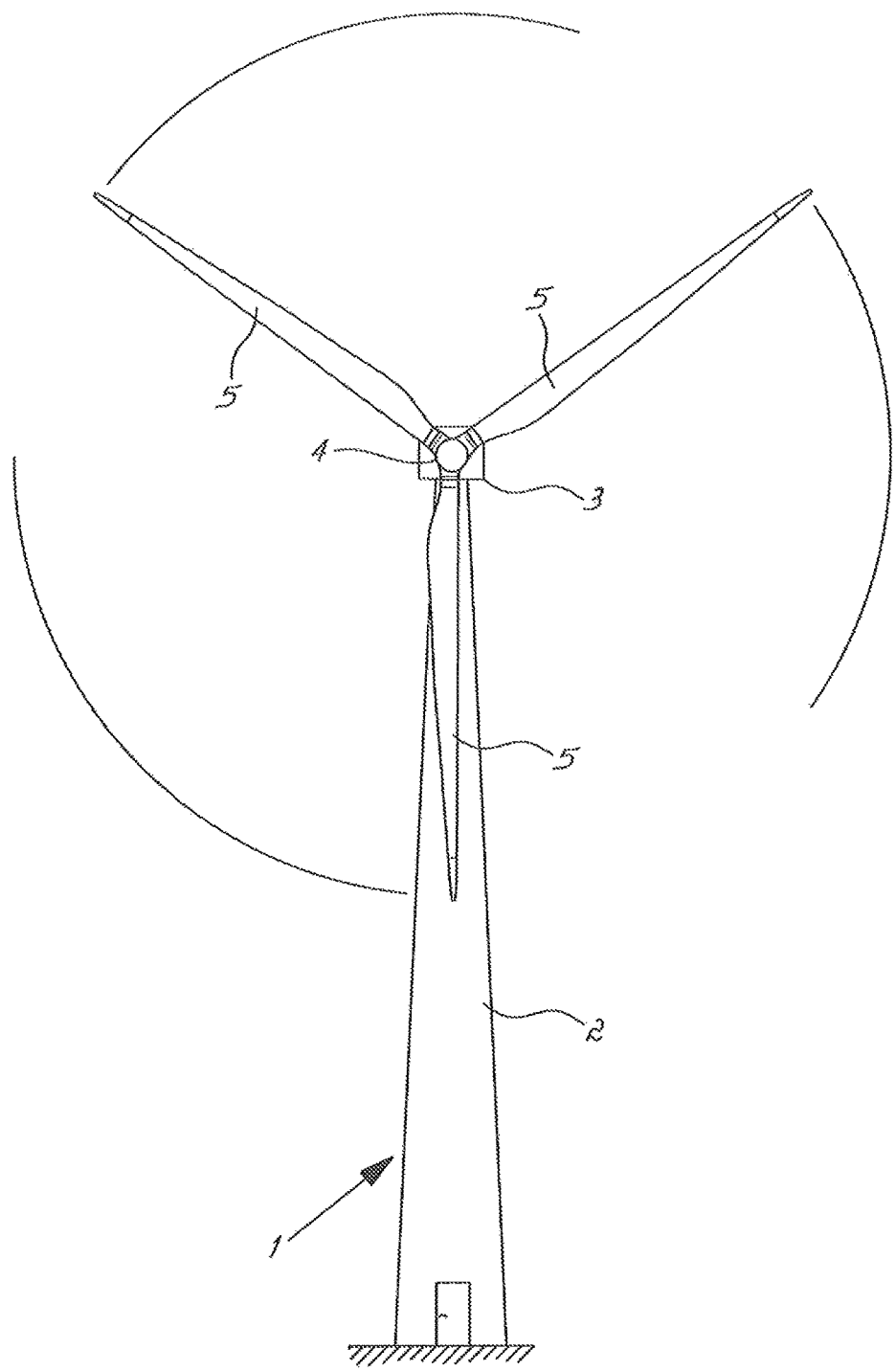
FIGS. 1 to 5 illustrate a wind turbine and a lightning current transfer unit according to the prior art, have already been described above by way of background to the present invention.
Figures 2A, 2B:
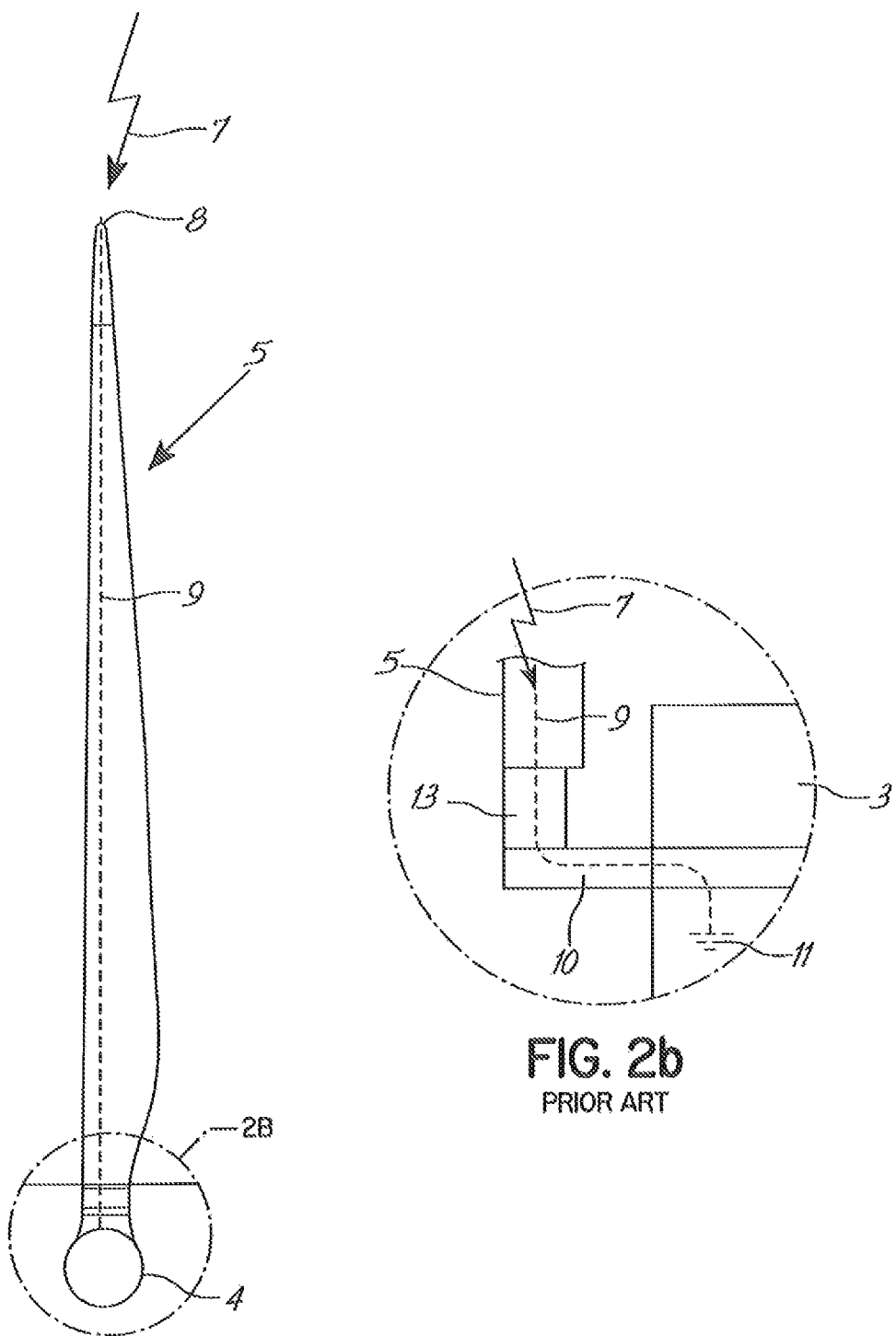
Figure 3B:
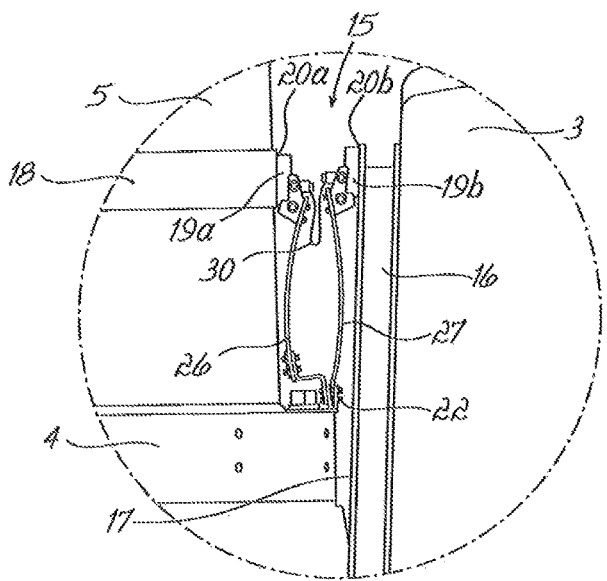
Figure 3A:
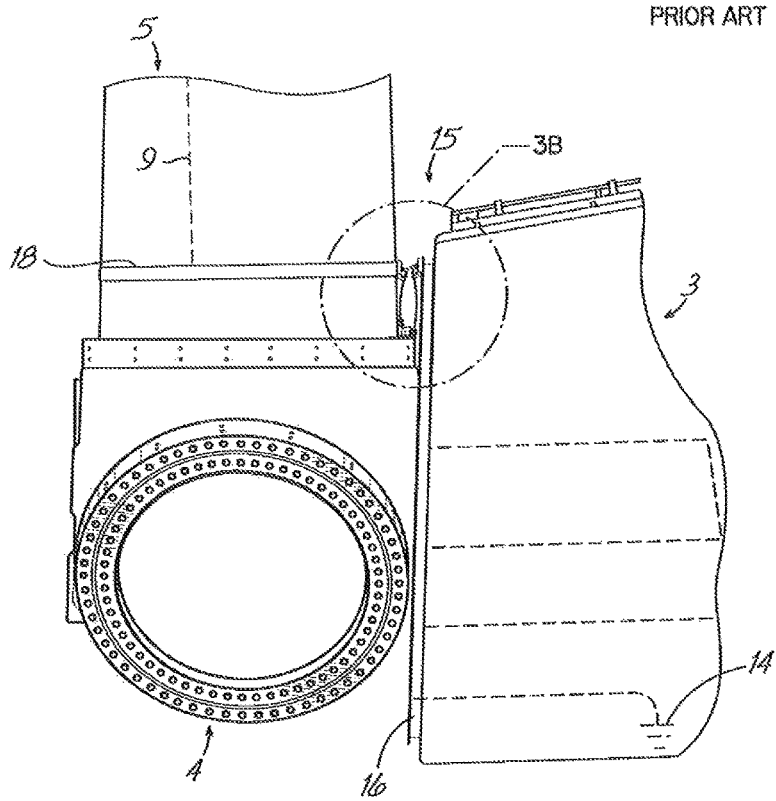
Figure 3C:
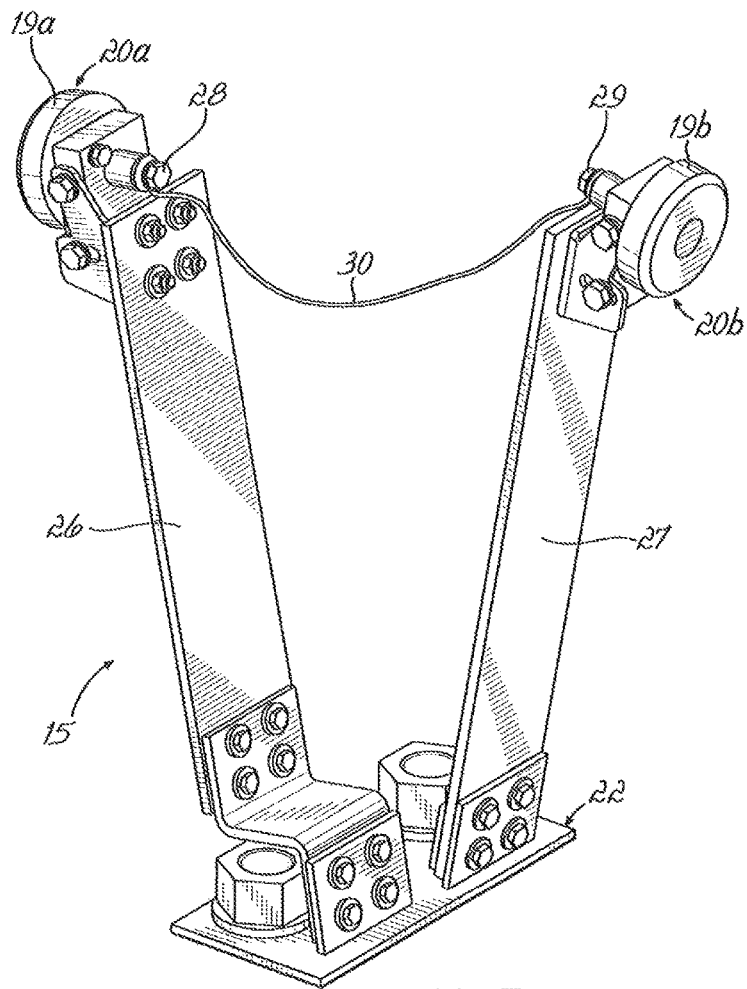
Figure 3D:
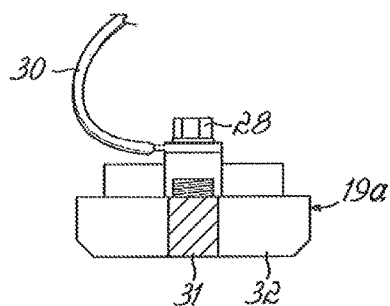
Figure 4:
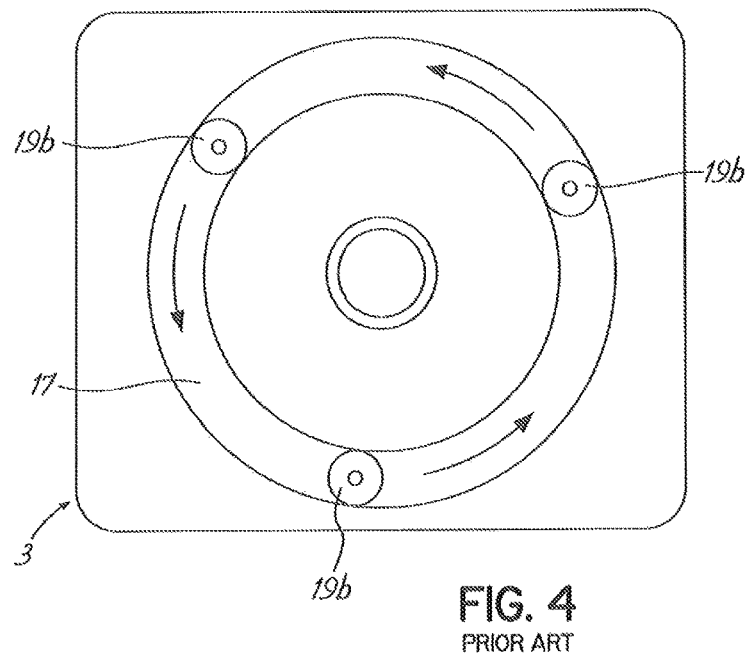
Figure 5:
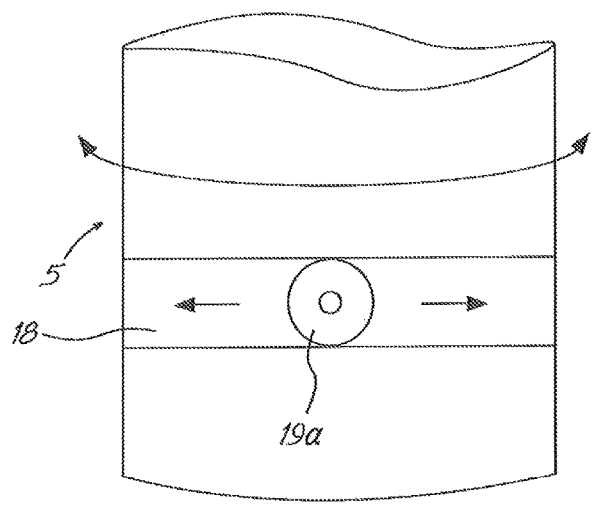
Figure 6A:
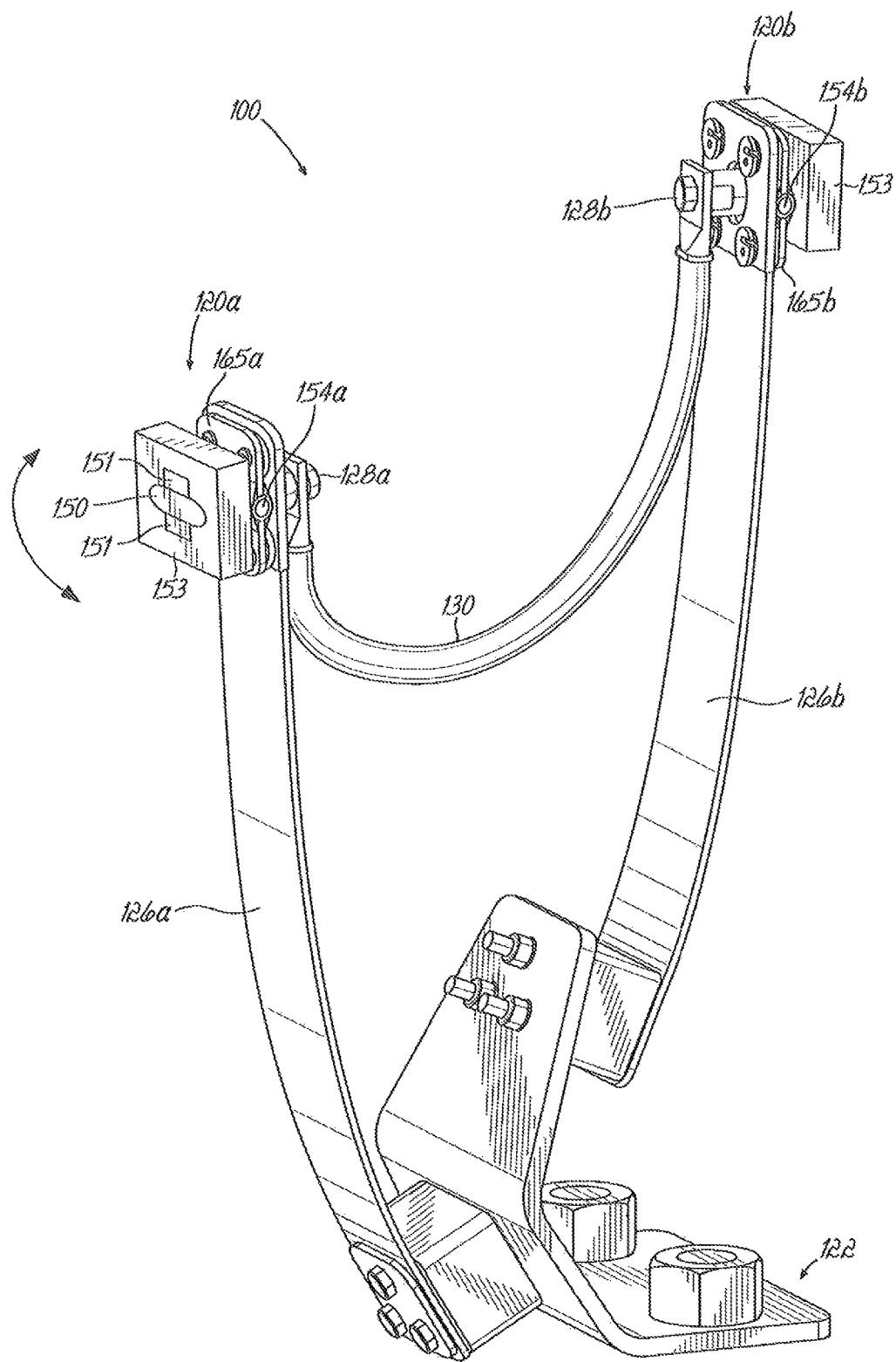
FIG. 6a is a perspective view of a lightning current transfer unit according to the invention.

FIG. 6a illustrates a lightning current transfer unit 100 according to an example of the present invention. The lightning current transfer unit 100 includes a base support 122 which is configured to be mounted on the hub of the wind turbine. From the base 122 extends a first main spring 126a and a second main spring 126b. The first main spring 126a and the second main spring 126b are each in the form of a sprung arm. At the end of the sprung arms 126a, 126b (opposite the base 122) there is a mounted first current transfer portion 120a and a second current transfer portion 120b. The first current transfer portion 120a and the second current transfer portion 120b are each in the form of a slider. The sprung arms 126a, 126b are non-conductive and act to push the current transfer portions 120a, 120b against contact surfaces on the blade and the nacelle. In this example, the sprung arms are formed from fibreglass. The first and second sliders 120a, 120b are thus electrically insulated from the hub.

The details of sliders will be described in more detail in relation to the Figures below, but in short they comprise a primary conductive contact 150, a pair of secondary conductive contacts 151 and the primary and secondary contacts are surrounded by a plastic slider 153.

The sliders 120a, 120b, are mounted via hinges 154a, 154b to the sprung arms 126a, 126b so that they can swivel in the direction indicated by the double headed arrow. The two sliders 120a, 120b are connected by an electric connection in the form of a discharge cable 130. The discharge cable 130 has a conductor with a cross-section of at least 50 mm$^2$ to allow it to discharge lightning current between the blade and the nacelle.

Each slider 120a, 120b also comprises a retaining bolt 128a, 128b for the discharge cable 130 allowing the discharge cable to be established and retained between the sliders.

Figure 6C:
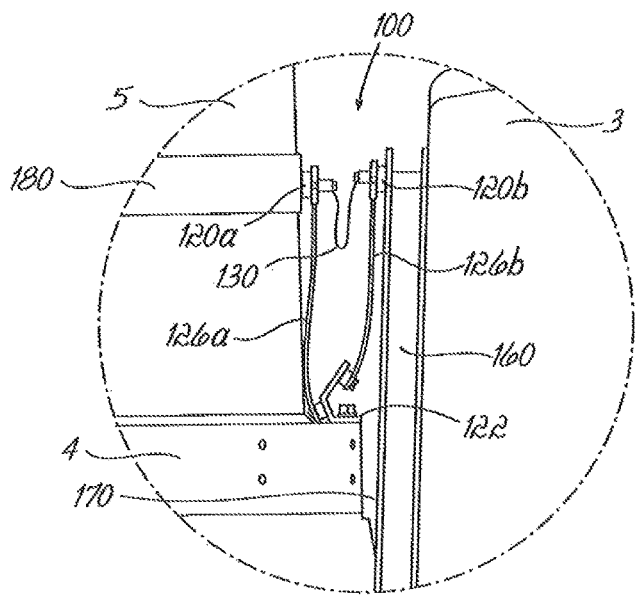
FIGS. 6b and 6c show the lightning current transfer unit according to the invention positioned on a wind turbine.
Figure 6B:
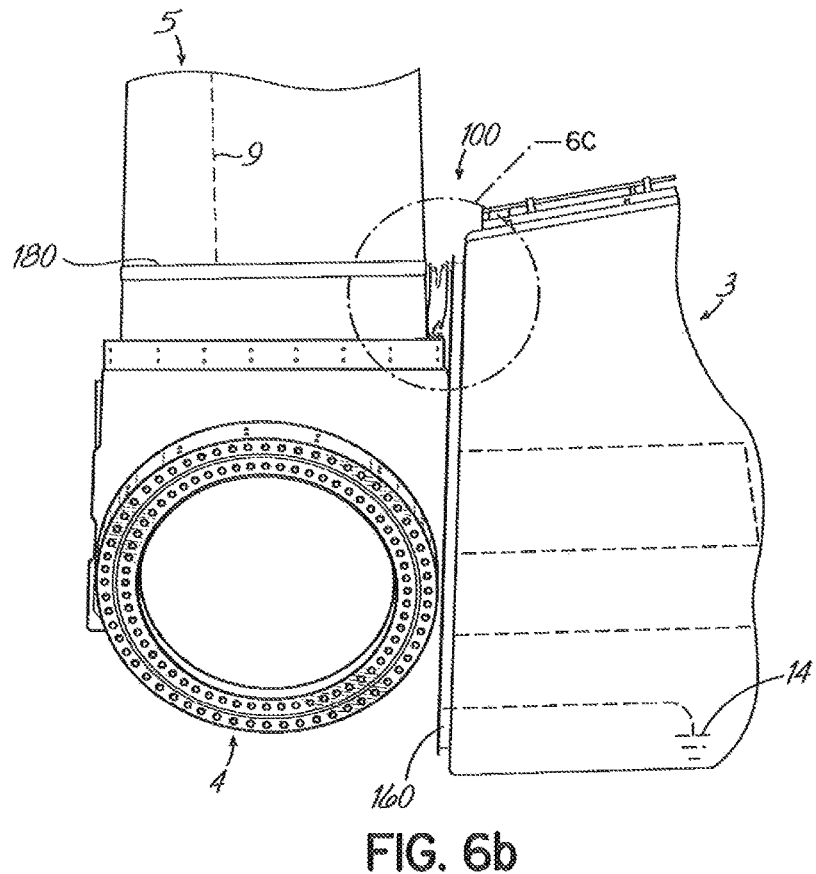

FIGS. 6b and 6c shows the lightning current transfer unit 100 of the present invention installed on a wind turbine hub. As described above in relation to the prior art above, the lightning current transfer unit 100 forms an electrical connection between a lightning down conductor 9 of each blade 5 of the rotor via an electrically conducting slideway (hereinafter called a blade band 180) around the outside of each blade of the wind turbine and a lightning down conductor of the nacelle 3 via an electrically conducting slideway on the nacelle (hereinafter called a nacelle ring 160). The lightning current transfer unit 100 is mounted on the hub 4 and projects outwardly from the hub 4 in a space between the wind turbine blade 5 and the front of the nacelle 3. As the lightning current transfer unit 100 is mounted to the hub, it rotates with the hub. The blade band 180 around the outside of each blade 5 surrounds the root of the blade. The band 180 forms a contact surface on the root of the wind turbine blade above the pitching mechanism. The blade band 180 thus rotates with pitching of the blade. Each blade band 180 is connected to the lightning down conductor 9 inside the wind turbine blade as described above in the introduction. The electrically conductive nacelle ring 160 is mounted on the outside of the nacelle 3 facing the hub 4, and is electrically connected to the nacelle ground/lightning down conductor 14. The nacelle ring 160 forms a contact surface 170 to the lightning current transfer unit 100. The sprung arms 126a, 126b ensure that the two sliders 120a, 120b are forced against the contact surface 180 on the wind turbine blade 5 and the contact surface 170 of the nacelle 3, respectively. Thus an electrical connection that bypasses the hub is established between the blade and the nacelle, by way of the discharge cable 130.

Figure 7A:
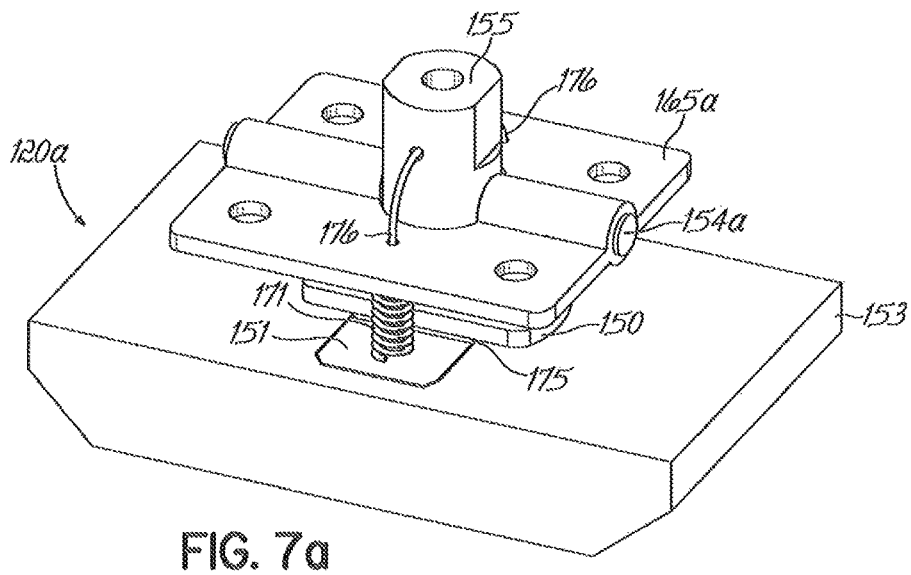
FIGS. 7a to 7c illustrate an example of a current transfer portion of the lightning current transfer unit of the invention.
Figure 7B:
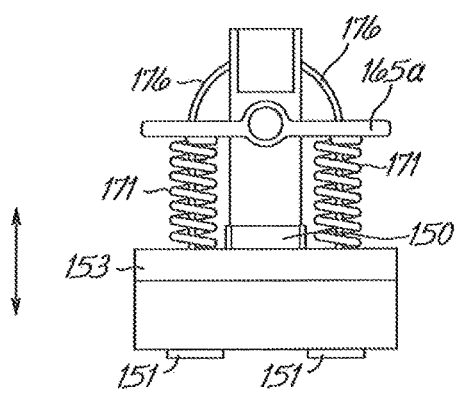
Figure 7C:
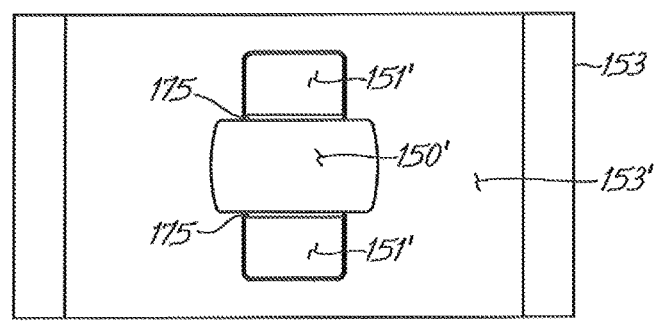

FIGS. 7a, 7b and 7c show a first example of the slider 120a in more detail. The slider 120b is identical to the slider 120a. FIG. 7a is a perspective view, FIG. 7b is an end view and FIG. 7c is a bottom view of the slider 120a. The bottom view of FIG. 7c is a view of the side that slides on the blade band 180.

The slider 120a comprises a primary conductive contact 150 and a pair of secondary conductive contacts 151 as described above. These contacts are surrounded by an insulating plastic slider 153 which in this example is a Nylatron® plastic.

At the bottom surface of the slider 120a, the primary contact 150 and the pair of secondary contacts 151 are exposed and form sliding surfaces 150', 151'. These sliding surfaces are configured to slide over the blade band or nacelle ring. The bottom surface 153' of the plastic slider 153 also slides over the blade band or the nacelle ring.

The primary contact 150 comprises a stem 155 that projects from the plastic slider 153. The stem 155 is connected to a non-conductive plate 165a through the hinge 154a. The plate 165a is bolted to the sprung arm 126a (not shown in FIG. 7) and thus the slider can swivel relative to the sprung arm 126a.

The primary contact 150 is mounted in the plastic slider 153 so that it is fixed relative to the plastic slider. That is, the primary contact 150 and the plastic slider 153 cannot move relative to each other.

The secondary contacts 151 are mounted in the plastic slider 153 but are provided in a hole in the plastic slider such that they can move up and down in the direction of the double headed arrow shown in FIG. 7b. That is the secondary contacts 151 can move relative to the primary contact 150 in a direction towards and away from the blade band. A secondary spring 171 which in this example is in the form of a compressive spring is provided between each secondary contact 151 and the non-conductive plate 165a. The secondary springs 171 bias the secondary contacts 151 away from the non-conductive plate 165a and out of the bottom of the plastic slider 153 and towards the blade band. As can be seen in FIG. 7b, the secondary contacts 151 are projecting from the bottom surface 153' of the plastic slider 153.

A gap 175 is provided between the primary contact 150 and the secondary contacts 151. The gap 175 is an air gap and means that the primary contact 150 and the secondary contacts 151 are not in direct electrical connection with each other within the plastic slider 153. However, a link wire 176 is connected to each of the secondary contacts 151 which extends through the respective secondary springs 171 and connects with the stem 155 of the primary contact 150. In this way, via the link wires 176, the primary contact 150 and the pair of secondary contacts 151 are electrically connected together.

Figure 8:
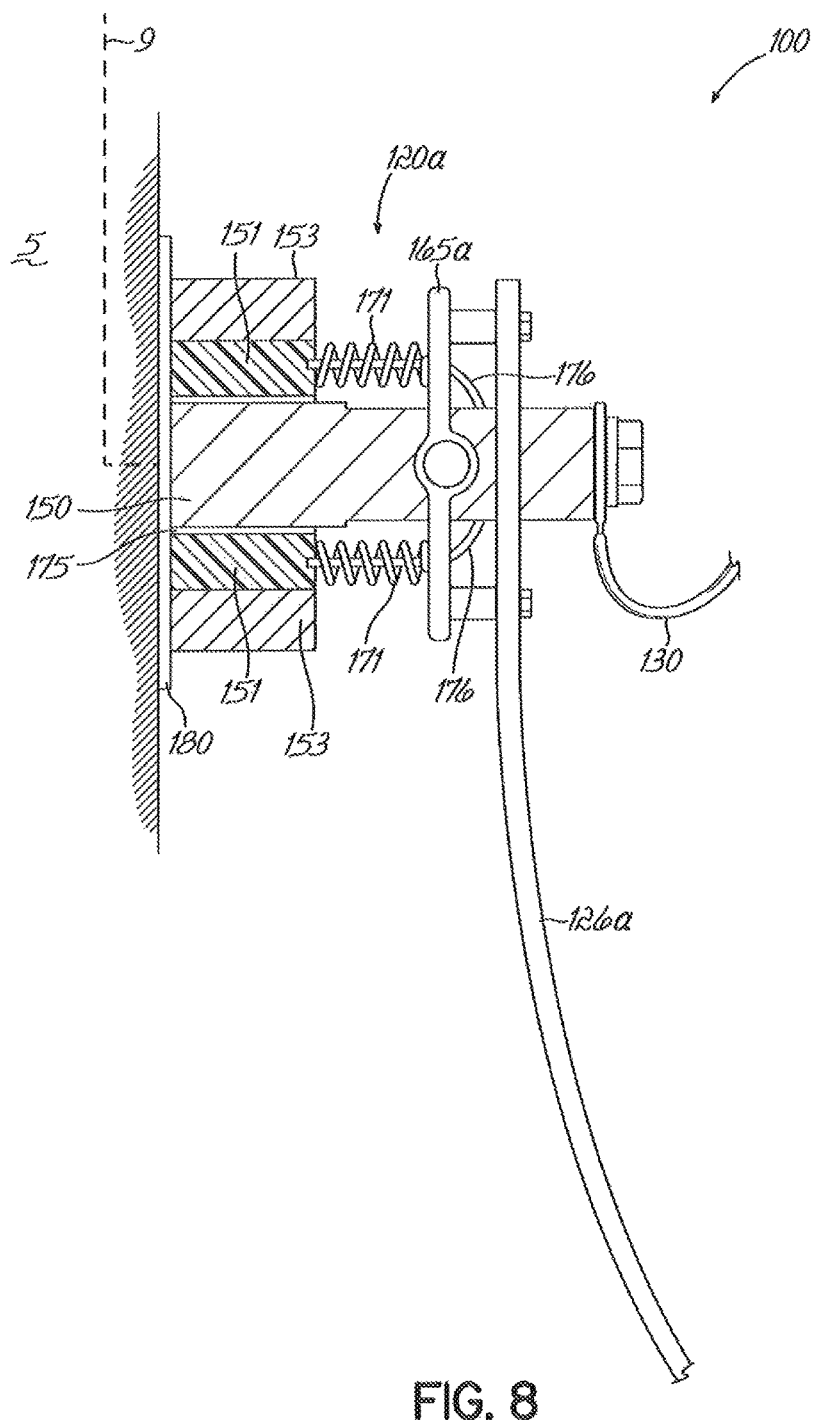
FIGS. 8 and 9 illustrate, in cross-section, the lightning current transfer unit positioned against a wind turbine blade.

FIG. 8 shows the slider 120a in cross-section biased against the blade band 180 of the blade 5. As described above, the sprung arm 126a acts as a spring and pushes the slider 120a against the blade band 180. Electrical charges originating from the blade 5 are transferred by the primary contact 150 and the secondary contacts 151 to the discharge cable 130.

The sprung arm 126a is designated here as a "main spring", and the pair of secondary springs 171 connected to the secondary contacts are collectively designated here as a "secondary spring". The main spring 126a biases the slider 120a against the blade band 180, but this biasing force is counteracted by the secondary spring 171. In a non-limiting example, the main spring provides a force of 50 N and the secondary spring provides a force of 10 N. Therefore, the force of the primary contact 150 against the blade band 180 is 40 N (that is 50 N-10 N). The force of the secondary contacts 151 against the blade band is provided by the secondary spring 171 and therefore each secondary contact is pushed against the blade band with a force of 5 N. The skilled person will appreciate that the actual force provided by the spring will depend on the particular arrangement of a particular wind turbine.

The primary contact 150 is fixed relative to the main spring whereas the secondary contacts 151 can move relative to the primary contact 150 in a direction towards and away from the blade band 180.

If a lightning strike hits the blade 5, the lightning current is conducted via the down conductor 9 to the blade band 180. The primary contact 150 and the secondary contacts 151 transfer the lightning current to the discharge cable 130. However, as will be described below it is actually desirable for most of the lightning current to flow through the primary contact 150, rather than lightning current flowing through the secondary contacts 151.

In operation of the wind turbine, as the blades rotate, static charge builds up on the blade and this static charge need to be discharged by the current transfer portion 120a to the discharge cable 130. As described with relation to the prior art, under certain site conditions the contacts may bounce off the blade band, which results in a loss of electrical connection between the slider and the bland band such that sparks and electro-magnetic interference may occur.

The provision of the secondary contacts 151 biased against the blade band 180 by the secondary spring 171 means that even if the primary contact 150 bounces off the blade band, the secondary contacts 151 will still remain in contact with the blade band. This reduces the likelihood of sparks and electro-magnetic interference occurring.

Figure 9:
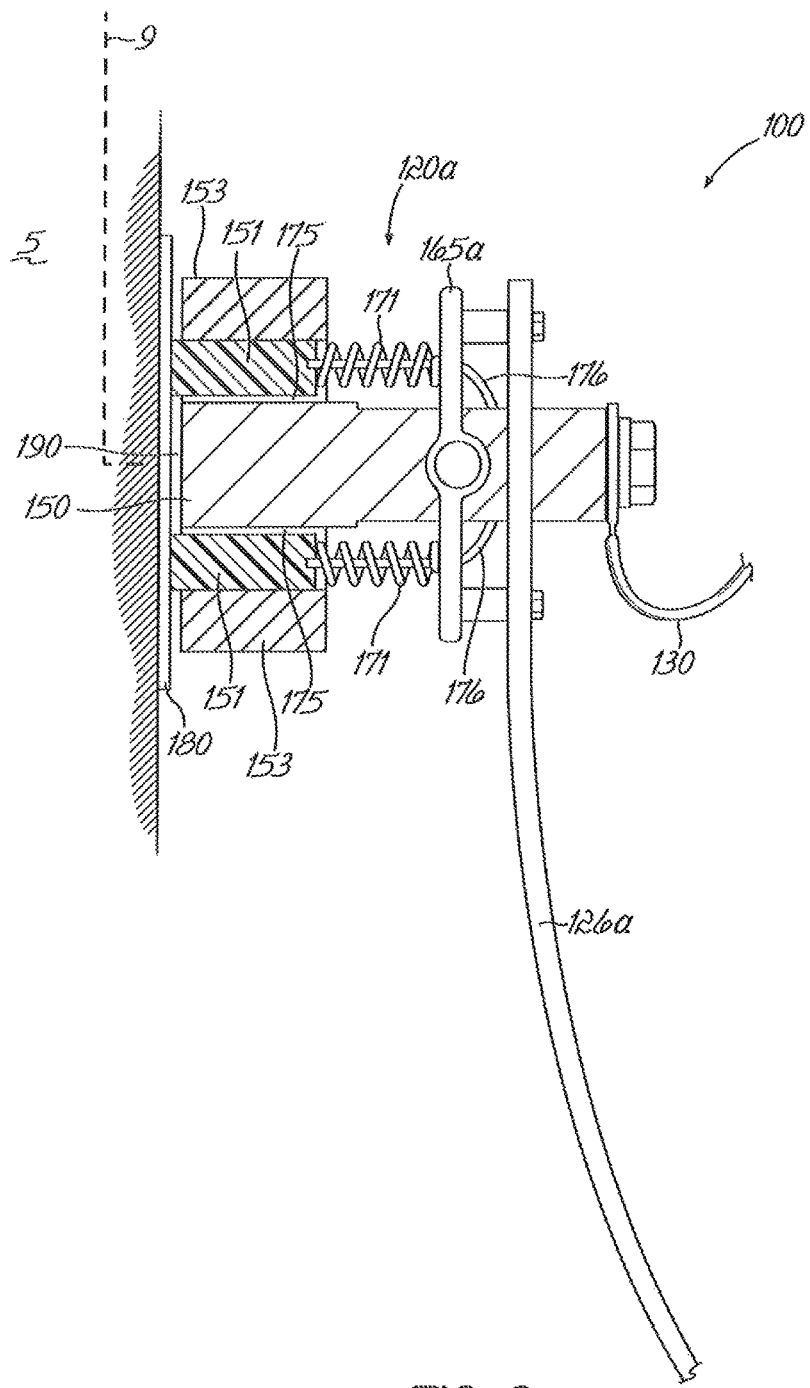

FIG. 9 shows a situation where the primary contact 150 has bounced off the blade band 180. There is now no direct electrical connection between the blade band 180 and the primary contact 150. However, the secondary springs 171 have extended so that the secondary contacts 151 remains in contact with the blade band 180. Therefore, any static charge that builds up on the blade 5 will be discharged via the secondary contacts 151, the link wires 176, the stem 155 and the discharge cable 130.

It should be appreciated that the space 190 that forms between the blade band 180 and the primary contact 150 when the slider 120a bounces is of the order of 0.1 mm and in a worst case scenario may be up to 1 mm.

Thus according to the invention, a permanent electrical contact between the lightning current transfer unit 100 and the blade band 180 is ensured, even if the primary contact 150 is no longer in contact with the blade band. Therefore, static charges can be continuously discharged from the blade even if the primary contact 150 separates from the blade.

As noted in the introduction above, it would be possible simply to configure the main spring 126a so that it pushes the slider 120a against the blade band 180 with a high force to prevent the contact from bouncing off the blade band. However, this would lead to too high a wear rate on the sliding parts of the current transfer unit. The invention with the main and secondary springs actually reduces the wear on the primary contact 150 and the plastic slider 153 so that their service life is increased.

The two types of electrical charge that need to be discharged from the blade to the nacelle via the lightning current transfer unit are lightning charges and the static charges. The peak lightning current that the blades are designed for is up to 200 K Amps (as defined in IEC 61400-24 2010) and the static charges will be of the order of 100 milliamps. The slider 120a is configured so that the lightning current will be discharged predominately via the primary contact 150 and the static charge will be discharged via the secondary contacts 151. The link wires 176 that connect the secondary contacts to the stem 155 of the primary contact are relatively thin and have a certain inductance in this example of $8 \times 10^{-8}$ H that limits the fast rise in current that occurs during a lightning strike. Therefore, in the event of a lightning strike the lightning current will predominantly be discharged through the primary contact 150.

With respect to the static charges, the static current is a direct current and therefore the link wires 176 do not limit the flow of the static current. The static charges will be discharged via the secondary contacts 151, the link wires 176 to the stem 155 and to the discharge cable 130.

In the case of sliding contacts, to discharge a high current it is necessary to have a high force acting on the sliding contact. This high force will lead to a high mechanical wear (i.e. grinding of the surface) of the sliding contact. Therefore, to reduce wear on a sliding contact it is necessary to reduce the force acting on the sliding contact. As the secondary contacts 151 will not be exposed to the full high lightning currents, the current they discharge will be the low magnitude static current. This allows the secondary contacts 151 to be configured such that they do not need to have a high force pushing them against the blade band 180, which will reduce the mechanical wear to which they are exposed.

The secondary contacts 151 are formed, in this example, from a graphite-copper alloy. The ratio may be 40% graphite to 60% copper (although other ratios are possible such as 53:47, 67:33 graphite:copper). The use of this graphite-copper alloy is particularly beneficial because it is self-lubricating and so there is no need for additional lubrication on the sliding surface between the contacts and the blade band 180. This reduces the wear on the secondary contacts 151.

The primary contact 150 is formed from brass which has good wear resistance—in particular it can transmit lightning current without significant wear and it has good corrosion resistance in the external environment.

FIGS. 10a, 10b and 10c show three further examples of the slider 120a. Like reference numerals have been used to designate like elements in the previous Figures. In FIGS. 10a, 10b, and 10c, the plate 165a and the sprung arm 126a have not been shown for clarity. The slider 120b on the nacelle side may be identical to the slider 120a of FIG. 10.

In FIG. 10a, the secondary spring is a single leaf spring 201. This leaf spring 201 is formed from stainless steel and is conductive. It is electrically connected to the secondary contacts 151 and to the stem 155 of the primary contact 150. The use of the conductive leaf spring 201 means that there is no need for the separate link wires 176, thus saving on parts and costs. Like the link wires 176 of FIGS. 7 to 9, the leaf spring 201 will have a certain inductance which will prevent the majority of the lightning current from being conducted through the secondary contacts 151.

In FIG. 10b, the secondary springs are in the form of conductive compressive helical springs 202 and are positioned between the secondary contacts 151 and a T-shaped part of the stem 155 of the primary contact 150. In this example, the compressive helical springs 202 are formed from stainless steel. Therefore, a current path is established between the blade band 180, the secondary contacts 151, the compressive helical springs 202 and the discharge cable 130. Again, as per the example of FIG. 10a, it is no longer necessary to include the link wires 176. The use of compressive helical springs 202 is particularly advantageous because they have a higher inductance compared to the link wires 176 and the leaf spring 201 (due to their coiled configuration). This higher inductance limits the lightning current that will be discharged through the secondary contacts 151 which will increase the life of the secondary contacts. In this example it is estimated that the inductance of the compressive helical springs 202 can be such that only 2.5% of the lightning current will be discharged though each secondary contact 151 meaning that 95% of the lightning current is discharged through the primary contact 150.

In FIG. 10c, there is only a single secondary contact 151 and this is received within a cavity of the primary contact 150. The secondary spring in this example is a compressive helical spring 203 that connects the secondary contact 151 and the primary contact 150. In this example, the compressive helical spring 203 is formed from stainless steel. An advantage of this arrangement is that the spring 203 is protected from environmental factors such as snow and ice.

Figure 11A:
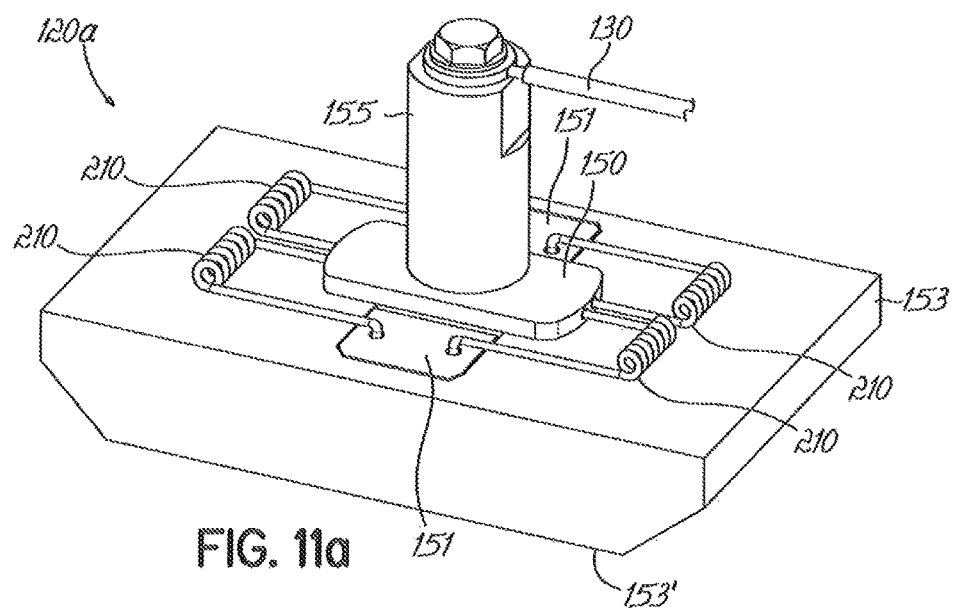
FIGS. 11a and 11b illustrate a further example of a current transfer portion.
Figure 11B:
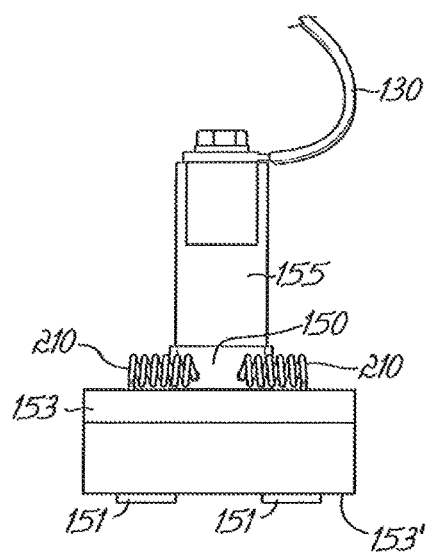

FIGS. 11a and 11b show a further example of the slider 120a in perspective and side view. The slider 120b on the nacelle side may be identical. The plate 165a and sprung arm 126a are not shown for clarity. As per the previous examples, the slider comprises a primary contact 150 and a pair of secondary contacts 151. The primary contact 150 is fixed relative to the plastic slider 153. The secondary contacts 151 as per the previous examples can move relative to the primary contact 150, within the plastic slider, in a direction towards and away from the blade band 180 (not shown in this Figure).

In FIG. 11a, the secondary spring which acts against the secondary contacts 151 is provided as four torsional helical springs, designated as 210. The torsional springs 210 are connected between the primary contact 150 and the secondary contacts 151. As shown in FIG. 11a two torsional springs act on each secondary contact and are biased against the primary contact 150. They are arranged so they push the secondary contacts out from the sliding surface 153' of the plastic slider 153 as shown in FIG. 11b. Therefore, when the slider 120a is pushed against the blade band 180 by the sprung arm 126a the secondary contacts 151 are pushed into the plastic slider (away from the bland band 180) and potential energy is stored in the torsional springs 210.

Like the example of FIGS. 10b and 10c, the torsional springs 210 are conductive and in this example are formed from stainless steel. Therefore, the torsional springs 210 provide an electrical connection between the secondary contacts 151, the primary contact 150 and the discharge cable 130. The torsional helical springs 210 form an air core inductor. The use of these torsional springs 202 is particularly advantageous because they have a high inductance compared to a straight wire because the wire is coiled. This high inductance limits the lightning current that can be discharged through the secondary contacts 151 which will increase the life of the secondary contacts. In this example it is estimated that the inductance of the torsional springs 210 can be such that only 2.5% of the lightning current will be discharged though each secondary contact 151 meaning that only 1.25% of the lightning current is discharged through each torsional spring. Limiting the current through the torsional springs 210 also increases their lifetime because if they were exposed to too high a current they may vaporise.

In the example of FIGS. 7, 10a, 10b and 11 there is a pair of secondary contacts 151. The use of two secondary contacts increases the likelihood of there being an electrical connection between the slider and the blade band. However, it is also possible to have one secondary contact. Alternatively, there may be more than two secondary contacts. If a pair of secondary contacts is used these may be arranged in a transverse direction with respect to the blade band (as per FIGS. 7, 10a, 10b and 11); alternatively they may be arranged in-line with the blade band.

Referring back to FIG. 7a there was described an air gap 175 between the primary contact 150 and the secondary contact 151. In other examples, this gap 175 may not be present. For example, there may be part of the plastic slider 153 provided between the primary contact and the secondary contact. Or, in another example, the primary contact and the secondary contact are in direct contact with each other and a face of the secondary contact slides against the neighbouring face of the primary contact.

Referring back to FIG. 6c it can be seen that there is a blade current transfer portion 120a that is pushed against the blade band 180 and a nacelle current transfer portion 120b that is pushed against the nacelle contact surface 170. However, FIG. 12a and in particular FIGS. 12b, 12c, 12d and 12e show, schematically, different arrangements for the blade current transfer portions and nacelle current transfer portions.

Figure 12A:
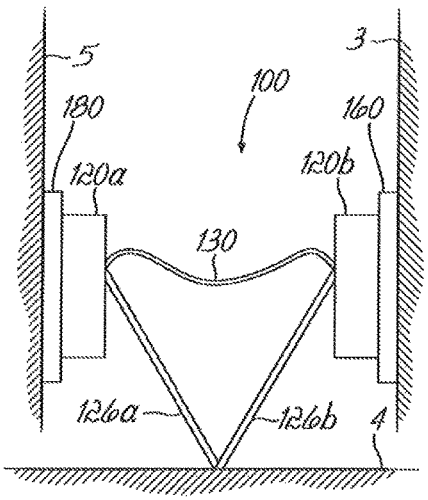
FIGS. 12a to 12e illustrate, schematically, possible positions for the lightning current transfer unit on a wind turbine.

FIG. 12a actually shows the arrangement of FIG. 6c. That is the lightning current transfer unit 100 comprises two sprung arms 126a, 126b mounted on the hub 4. A blade current transfer portion 120a in the form of a slider is electrically coupled to the blade band 180 and rotates relative thereto. A nacelle current transfer portion 120b in the form of a slider is electrically coupled to the nacelle ring 160 and rotates relative thereto. The blade current transfer portion 120a and the nacelle current transfer portion 120b are electrically connected by the discharge cable 130. The sprung arms 126a, 126b mounted on the hub 4 force both current transfer portions against their respective contact surfaces.

Figure 12B:
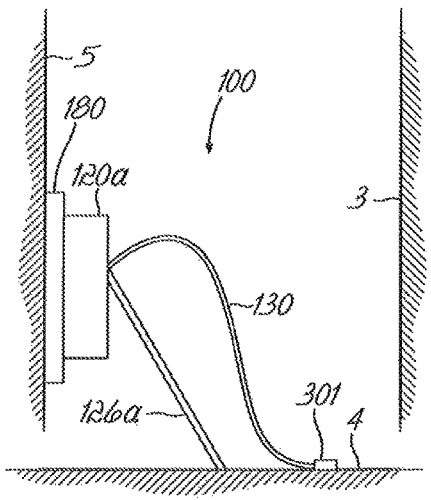

FIG. 12b shows a lightning current transfer unit 100 where the blade current transfer portion 120a is the same as that of FIG. 12a in the form of a slider. However, the discharge cable 130 is connected directly to the hub 4 at a terminal 301. The terminal 301 acts as the nacelle current transfer portion. In this example, electrical charges from the blade will only bypass the pitch bearings in the blade and will not bypass the main shaft in the nacelle.

Figure 12C:
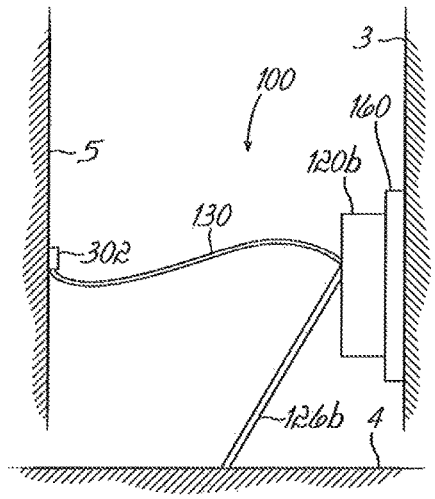

FIG. 12c shows a lightning current transfer unit 100 where the nacelle current transfer portion 120b is the same as that of the FIG. 12a and is in the form of a slider. However, the discharge cable 130 is connected directly to the blade 5 at a terminal 302. The terminal 302 acts as the blade current transfer portion. This example may be used where the blade 5 has a fixed pitch and there are no pitch bearings.

Figure 12D:
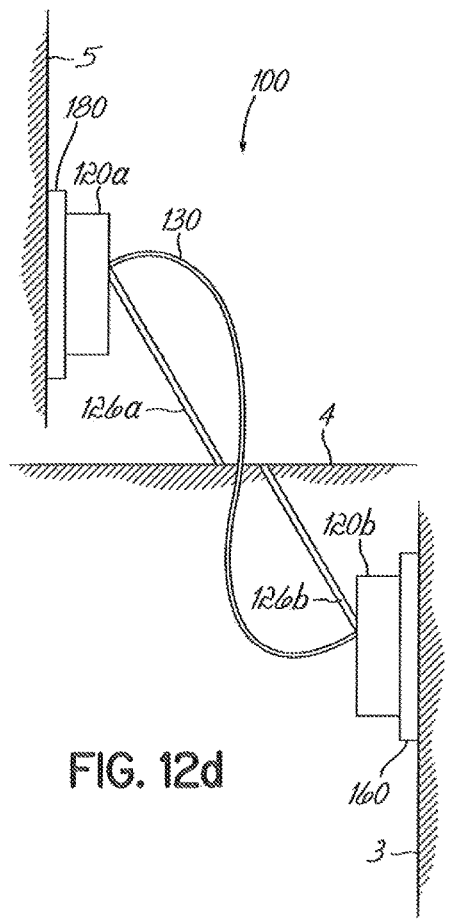

FIG. 12d shows a lightning current transfer unit 100 where the blade current transfer portion 120a is located external to the hub 4 and the nacelle current transfer portion 120b is located in an in interior of the hub. The nacelle ring 160 is mounted to a front face of the nacelle 3. Here it can be seen that the sprung arms 126a and 126b are actually separated and the discharge cable 130 runs from outside of the hub to an interior of the hub.

Figure 12E:
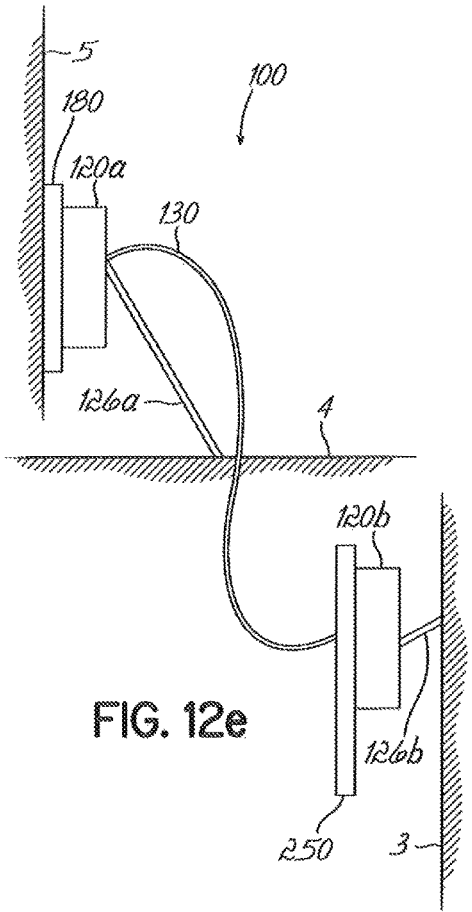

FIG. 12e shows a lightning current transfer unit 100 where the blade current transfer portion 120a is located external to the hub 4 and the nacelle current transfer portion 120b is located in an in interior of the hub. In this example, the nacelle current transfer portion 120b is in the form of a slider and is mounted on the nacelle 3 by the sprung arm 126b and so the hub 4 rotates relative to the slider 120b. The nacelle ring 160 of FIGS. 12a, 12c and 12d has been replaced with a hub ring 250 which is a circular slideway which is fixed relative to the hub 3 and so rotates therewith. The hub ring 250 is mounted on the hub 4 but is electrically insulated from the hub—for example by being mounted to the hub by electrically insulating fibre glass arms. The sprung arm 126b biases the nacelle current transfer portion 120b against the hub ring 250. The hub ring 250 is electrically connected to the blade current transfer portion 120a by the discharge cable 130. A further electrical connection (not shown) will electrically connect the nacelle current transfer portion 120b to ground in the nacelle 3.

The present invention is not limited to the examples described above and many other variations or modifications will be apparent to the skilled person without departing from the scope of the present invention as defined in the following claims.

The invention claimed is:

1. A lightning current transfer unit for a wind turbine, the wind turbine comprising a first part and a second part being rotatable relative to each other, wherein the lightning current transfer unit is arranged to provide electrical contact between the first and second parts, the lightning current transfer unit comprising:
  a first current transfer portion comprising a first slider and configured to be electrically coupled to a first electrically conducting slideway of the first part of the wind turbine, the first slider being rotatable relative to the first slideway;
  a second current transfer portion configured to be electrically coupled to an electrically conducting portion of the second part of the wind turbine;
  a first main spring biasing the first slider towards the first slideway;
  wherein the first slider comprises:
    a primary contact biased towards the first slideway by the first main spring;
    a secondary contact arranged to move relative to the primary contact; and
    a secondary spring arranged between the first main spring and the secondary contact such that the secondary spring biases the primary contact away from the first slideway and biases the secondary contact towards the first slideway.

2. The lightning current transfer unit of claim 1, wherein the primary contact and the first slideway form a first current path to discharge electric charges from the first part, and the secondary contact and the first slideway form a second current path to discharge electric charges from the first part.

3. The lightning current transfer unit of claim 1, wherein the first main spring is a non-conductive elastically bendable strip.

4. The lightning current transfer unit of claim 3, wherein the first slider is hinged to the elastically bendable strip.

5. The lightning current transfer unit of claim 1, wherein the secondary spring is arranged between the primary contact and the secondary contact.

6. The lightning current transfer unit of claim 1, wherein the secondary spring is electrically conductive.

7. The lightning current transfer unit of claim 1, wherein the secondary spring is a coil spring.

8. The lightning current transfer unit of claim 1, wherein the secondary spring is a compression spring.

9. The lightning current transfer unit of claim 1, wherein the secondary spring is a torsion spring.

10. The lightning current transfer unit of claim 1, wherein the secondary spring provides a path for electrical current between the secondary contact and the primary contact.

11. The lightning current transfer unit of claim 1, further comprising an electrically insulating material surrounding the primary and secondary contacts, wherein the electrically insulating material is fixed relative to the primary contact.

12. The lightning current transfer unit of claim 11, wherein the electrically insulating material is formed from plastic.

13. The lightning current transfer unit of claim 12, wherein the electrically insulating material is configured to slide on the first slideway.

14. The lightning current transfer unit of claim 1, wherein the primary and secondary contacts are sliding contacts.

15. The lightning current transfer unit of claim 1, wherein the secondary contact is an alloy comprising copper and graphite.

16. The lightning current transfer unit of claim 1, wherein the electrically conducting portion of the second part comprises a second electrically conducting slideway, wherein the second current transfer portion comprises a second slider configured to be electrically coupled to the second electrically conducting slideway, the second slider being rotatable relative to the second slideway;

the lightning current transfer unit further comprising a second main spring biasing the second slider towards the second slideway;

wherein the second slider comprises:
a second primary contact biased towards the second slideway by the second main spring;
a second secondary contact arranged to move relative to the second primary contact; and
a second secondary spring arranged between the second main spring and the second secondary contact such that the second secondary spring biases the second primary contact away from the second slideway and biases the second secondary contact towards the second slideway.

17. A wind turbine comprising a hub, a nacelle, a blade and a lightning current transfer unit according to claim 1, the lightning current transfer unit enabling electrical charges to be discharged from the blade to the nacelle.

18. The wind turbine of claim 17, wherein the first part of the wind turbine is the blade, and the blade is pitchably mounted on the hub and the first slideway is mounted on the blade.

19. The wind turbine of claim 17, wherein the first part of the wind turbine is the nacelle, and the first slideway is mounted on the nacelle.

20. The wind turbine of claim 17, wherein the first part of the wind turbine is the hub, and the first slideway is mounted on the hub.

21. The wind turbine of claim 17, wherein the first part of the wind turbine is the blade, and the blade is pitchably mounted on the hub and the first slideway is mounted on the blade;

the second part of the wind turbine is the nacelle and the second slideway is mounted on the nacelle;

and the first main spring and the second main spring are mounted on the hub and electrically insulated from the hub;

wherein the first and second sliders are electrically connected in order to establish a current path from the blade to the nacelle thereby electrically bypassing the hub.

22. The wind turbine of claim 17, wherein the first part of the wind turbine is the blade, and the blade is pitchably mounted on the hub and the first slideway is mounted on the blade;

the second part of the wind turbine is the nacelle and the second slideway is mounted on the hub and electrically insulated from the hub;

the first slider is mounted on the hub by the first main spring and electrically insulated from the hub; and the second slider is mounted on the nacelle by the second main spring;

wherein the first and second sliders are electrically connected in order to establish a current path from the blade to the nacelle thereby electrically bypassing the hub.

* * * * *